F. WESTERBECK.
CONTAINER.
APPLICATION FILED MAR. 9, 1918.
1,370,865.
Patented Mar. 8, 1921.
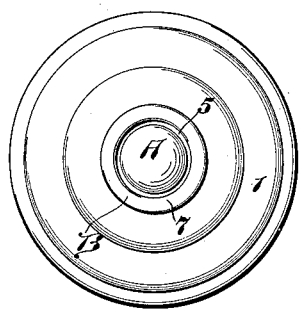
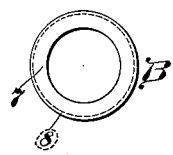
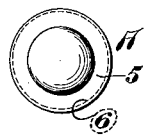
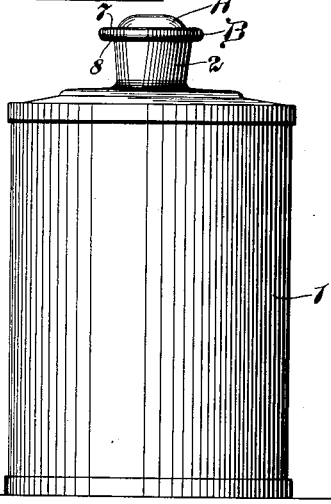
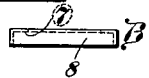
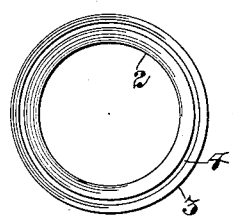
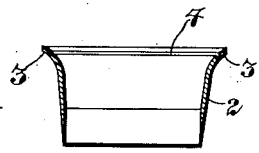
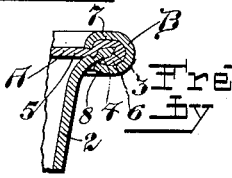
Inventor
Frederick Westerbeck,
by Knight & Cook
His Attorneys.
Attest.
Charles A. Becker.

UNITED STATES PATENT OFFICE.

FREDERICK WESTERBECK, OF ST. LOUIS, MISSOURI.

CONTAINER.

1,370,865.         Specification of Letters Patent.         Patented Mar. 8, 1921.

Application filed March 9, 1918. Serial No. 221,481.

*To all whom it may concern:*

Be it known that I, FREDERICK WESTERBECK, a citizen of the United States of America, a resident of the city of St. Louis, State of Missouri, have invented certain new and useful Improvements in Containers, of which the following is a full, clear, and exact description, reference being had to the accompanying drawing, forming a part of this specification.

My invention relates to a container made of sheet metal, and more particularly stated, the invention pertains to closures for sheet metal vessels applied without the use of solder, the invention being of special merit in hermetically sealing sheet metal cans containing ether or other volatile and inflammable liquids. It has been almost the universal practice, prior to my invention, to secure the closures of sheet metal cans containing ether and the like by the application of solder to the closures, a practice which requires great skill on the part of the operators, due to the nature of the contents of the cans, and also involves considerable danger owing to the nature of such contents. Furthermore, the soldering of such closures is frequently not altogether perfect and there is consequent loss due to the contents of the cans escaping through the imperfectly soldered closures. My present invention provides an absolutely air tight closure without the use of solder and is of such construction that it may be readily opened by any sharp instrument.

Figure I is a top view of my container.

Fig. II is an elevation of the container.

Fig. III is an enlarged vertical section through the upper portion of the container.

Fig. III<sup>a</sup> is an enlarged fragmentary vertical section through the container neck and the closure applied thereto.

Figs. IV and V are respectively top and edge views of the binding ring of the closure, as it appears before it is applied to the container.

Figs. VI and VII are respectively top and edge views of the closure cap as it appears before application to the container.

Fig. VIII is an enlarged top view of the container neck.

Fig. IX is an enlarged vertical section through the container neck.

In the drawings, 1 designates the body of my sheet metal container surmounted by a filling and pouring neck 2 which may be formed upon the head of the sheet metal body or secured thereto in any suitable manner.

The pouring neck 2 is flared outwardly and upwardly, forming a flaring annular lip 3 terminating in a raw edge at the upper and outer end of the flaring lip. The margin of said annular upwardly flared lip, being thin, is yieldable under pressure, and, therefore, is susceptible of being bent downwardly for a purpose to be hereinafter explained. In the top of the lip 3 near its edge is an annular groove 4.

A designates a closure cap preferably of soft metal, for example, lead, said closure cap comprising initially an upper disk portion 5 and an annular flange 6 extending downwardly at an angle to the disk portion, as seen in Figs. VI and VII. This cap is adapted to be applied to the container neck 2 so that its disk portion will rest upon the top edge of said neck, and the flange 6 will encircle and embrace the raw edge of the lip 3 beneath the surface on which the disk portion of the cap rests.

B designates a binding band for securing the cap A to the container neck 2. As shown in Figs. IV and V this binding band comprises an upper ring 7 and an annular flange 8 extending downwardly at an angle to said ring.

In applying my closure to a container the soft metal cap is first fitted onto the flaring lip at the upper end of the container neck 2 so that its flange 6 will encircle said lip and extend vertically beyond the lower surface of the lip at its raw edge. The binding band B is then fitted over the cap A with its flange 8 encircling the flange of the cap, and extending downwardly to a point beneath the raw edge of the lip 3. Thereafter, pressure is applied, by the use of suitable tools or implements, to the periphery of the binding band B, to the top surface of said band and to the lower portion of the flange of the band, the application of pressure at the last mentioned point being such as to bend the lower portion of the flange of the band inwardly and then upwardly beneath the flaring lip of the container neck 2. When pressure is applied to the binding band as described, the flange of said band is bent or curled upwardly to force the flange of the cap A inwardly beneath the flaring lip of the container neck, and against the upwardly extending raw edge of said lip.

At the same time the upper ring portion of the binding band is forced downwardly so that the lip of the container neck becomes tightly wedged between the disk portion of the cap A and the inturned flange of said cap. The lip of the container neck extending beyond the groove 4 being yieldable and in the form of an annular flange becomes adjusted from an upwardly inclined position toward a horizontal position in consequence of the pressure applied to the closure band B, and therefore the upwardly extending edge of the lip 3 is expanded and forcibly embedded into the flange of the soft metal cap A with the result of enhancing the hermetic sealing action in the closure. The outward thrust, resulting from the expansion of lip 3, is resisted by the relatively strong band B, so the raw edge of lip 3 is forcibly embedded in the soft metal flange 6 while the latter is securely confined by the strong band B. Therefore, the band B prevents expansion of the interposed soft metal during the sealing operation, while the raw edge is being forced into the soft metal, and this firm band also protects the sealed joint from accidental mutilation after the lip has been embedded in the soft metal. The sealing action is further augmented by forcing a portion of the disk of the soft metal cap A into the groove 4 near the upper end of the closure lip, as seen in Figs. III and III$^a$. This action is obtained by curling the ring 7 of the binding band downwardly under pressure so that its edge is presented toward the groove 4 to embed the soft metal cap therein.

I claim:—

1. A container provided with a closure-receiving member having an annular sealing flange provided with a sharp annular edge, a soft metal cap seated on said sealing flange and having a depending soft metal flange surrounding said sharp annular edge, and a binding band closely fitted to said soft metal cap at a point directly opposite said sharp edge and having its margins turned inwardly to closely confine the soft metal against the upper and lower faces of said sealing flange, marginal portions of said soft metal cap being interposed directly between said binding band and the sharp annular edge, and said sharp edge being embedded in said soft metal cap.

2. A container provided with a closure-receiving member having an annular sealing flange provided with a sharp annular edge, a soft metal cap seated on said sealing flange and having a depending soft metal flange surrounding said sharp annular edge, and a binding band closely fitted to said soft metal cap at a point directly opposite said sharp edge and having its margins turned inwardly to closely confine the soft metal against the upper and lower faces of said sealing flange, marginal portions of said soft metal cap being interposed directly between said binding band and the sharp annular edge, and said sharp edge being embedded in said soft metal cap, said binding band being in the form of an endless ring approximately U-shaped in cross section, so as to embrace said sealing flange and the margin of said soft metal cap, and said soft metal cap being exposed inside of said ring to receive an instrument for cutting the soft metal.

3. A container provided with a closure-receiving member having a sealing flange provided with an annular groove and a sharp raw edge, a soft metal cap seated on said sealing flange and having a depending soft metal flange surrounding said sharp raw edge, and a binding band closely fitted to said soft metal cap at a point directly opposite said sharp edge and having its margins turned inwardly to closely confine the soft metal above and below said sealing flange, marginal portions of the soft metal cap being interposed directly between said binding band and the sharp edge, said sharp edge being embedded in the soft metal, and an annular portion of said soft metal being extended into said annular groove.

4. A container comprising a closure-receiving member having a yieldable upwardly flaring annular expansible flange terminating in a raw upper edge and provided with an annular groove, a soft metal cap seated on said upwardly flaring expansible flange and having a depending soft metal flange surrounding said raw edge, and a binding band closely fitted to said soft metal cap and having its margins turned inwardly to closely confine the soft metal above and below said annular groove, the soft metal flange of said cap being interposed directly between and engaged with said raw edge and binding band, and said upwardly flaring expansible flange being expanded to embed its raw edge in said soft metal flange.

In testimony that I claim the foregoing I hereunto affix my signature.

FREDERICK WESTERBECK.